United States Patent [19]

Boulay et al.

[11] 4,216,519
[45] Aug. 5, 1980

[54] ELECTROSTATIC DISCHARGER, PARTICULARLY FOR AIRCRAFTS

[75] Inventors: Jean-Louis Boulay, Chatenay-Malabry; Roland J. Hoarau, L'Hay-Les-Roses, both of France

[73] Assignee: Office National d'Etudes et de Recherches Aerospatiales (ONERA), Chatillon, France

[21] Appl. No.: 896,587

[22] Filed: Apr. 14, 1978

[30] Foreign Application Priority Data

Apr. 19, 1977 [FR] France .................. 77 11763

[51] Int. Cl.² .................................. H05F 3/04
[52] U.S. Cl. ............................ 361/218; 361/222
[58] Field of Search ............... 361/212, 218, 222

[56] References Cited

U.S. PATENT DOCUMENTS

| 2,536,818 | 1/1951 | Lawton | 361/222 |
| 3,034,020 | 5/1962 | Benkoczy et al. | 361/218 |
| 3,585,447 | 6/1971 | McLain | 361/222 |
| 3,594,611 | 7/1971 | Tanner et al. | 361/218 |
| 3,742,300 | 6/1973 | Floyd | 361/218 |

FOREIGN PATENT DOCUMENTS 1010490  11/1965  United Kingdom ............ 361/218

Primary Examiner—J. D. Miller
Assistant Examiner—L. C. Schroeder
Attorney, Agent, or Firm—Karl F. Ross

[57] ABSTRACT

An electrostatic discharger has a stem of high electric resistivity fastened at one end to an aircraft body and secured at its other end to an enlarged head provided with a sharp circular charge-emitting edge in a plane perpendicular to the stem axis. The edge, bounded by two annular surfaces converging at an acute angle with a radius of curvature of the order of 0.05 mm, may project radially or axially from the head and in either case has a diameter greatly exceeding that of the stem.

8 Claims, 6 Drawing Figures

ELECTROSTATIC DISCHARGER, PARTICULARLY FOR AIRCRAFTS

FIELD OF THE INVENTION

Our present invention relates to an electric static discharger, particularly for aircrafts.

BACKGROUND OF THE INVENTION

It is known that, for avoiding interferences in radio receivers installed on an aircraft, the latter has to be equipped with one or more devices designed to dissipate the electric charges appearing on the surface of the aircraft.

Such electrostatic dischargers rely on the "corona effect" and have generally a body of tapered shape with a free end spaced apart from the aircraft body.

Some of these dischargers are formed with a conductive point or a pair of diametrically opposite points electrically connected to the aircraft body through a resistor of relatively large magnitude of the order of a few tens of megohms.

There has also been proposed the use of a static discharger with a multiplicity of discharge points formed by the ends of filaments insulated from one another.

Finally, known a static discharger has a cylindrical stem of predetermined resistivity, made of a plastic material containing conductive particles, designed to carry off the electric charges at the junction between the front end and the periphery of the stem; this front end may have a conical shape in order to increase the corona effect.

However, none of the known, electrostatic dischargers perform in an entirely satisfactory manner under the complex operating conditions encountered in practice.

As a matter of fact, a static discharger not only should reduce the "noise" generated by all the static discharges in the aircraft radio receivers, a task is provided only imperfectly accomplished in a number of actually constructed or proposed dischargers, but should also have a high discharge efficiency and a low operation threshold in order to simplify the equipment of an aircraft with static dischargers by reducing their number. Moreover, the discharger should operate satisfactorily in the various states where electric charges appear on the aircraft, having regard to flying conditions and to the composition of the atmosphere, and it should also offer a good resistance to wear through erosion in order to avoid the need for frequent replacement.

OBJECT OF THE INVENTION

The object of our present invention is to provide an improved electrostatic discharger satisfying these desiderata.

SUMMARY OF THE INVENTION

A discharger according to our invention has a stem of high electric resistivity fastenable at one end to an aircraft body and provided at its other end with an enlarged head coaxial therewith. The head has an annular zone of homogeneous resistive material forming a continuous circular charge-emitting edge in a plane transverse to the stem axis, this edge having a diameter substantially exceeding that of the stem and being bounded by two substantially flat annular surfaces—either or both of which may be frustoconical—converging at an acute angle.

The spacing of the head from the aircraft body should be such that the electric resistance between that body and the charge-emitting edge has a value of the order of a few tens of megohms.

Advantageously, the head has a flared rear surface faired into the stem periphery for enhancing the efficiency of the corona effect and satisfying aerodynamic considerations. The head may be detachably connected with the stem to facilitate its replacement.

The head can be made as a monobloc unit of homogeneous resistive material or as an assembly of several members one of which defines the charge-emitting edge.

BRIEF DESCRIPTION OF THE DRAWING

The above and other features of our invention will now be described in detail with reference to the accompanying drawing in which.

SPECIFIC DESCRIPTION

Figure 1:
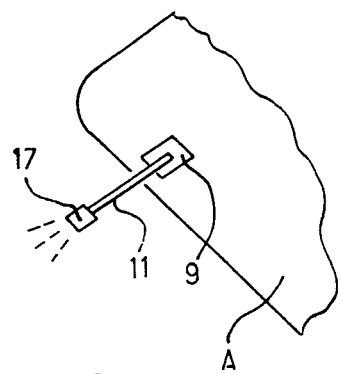
FIG. 1 is a schematic view of part of an aircraft equipped with a static discharger.
Figure 2:
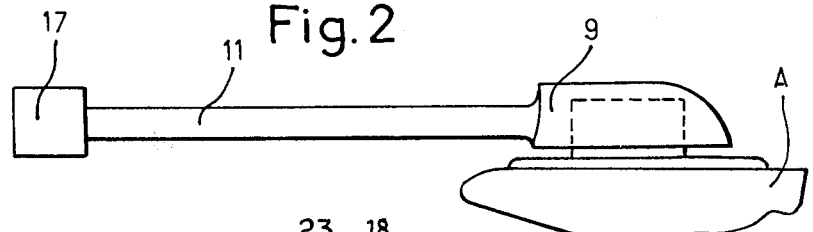
FIG. 2 is an enlarged overall view of the static discharger.

The static discharger shown in FIGS. 1 and 2 comprises a stem 11 having one end connected to an aircraft body A via a fixation device 9 providing electrical conduction between the stem and the aircraft.

The stem may consist of a homogeneous material whose electric resistance from one end to the other is of the order of 20 to 50 megohms.

Alternatively, the stem could be made of an insulating material, such as nylon or glass fibers, and be coated with a slightly conductive paint, for instance a resin loaded with conductive particles in such concentration that the electric resistance has the required value.

Figure 3:
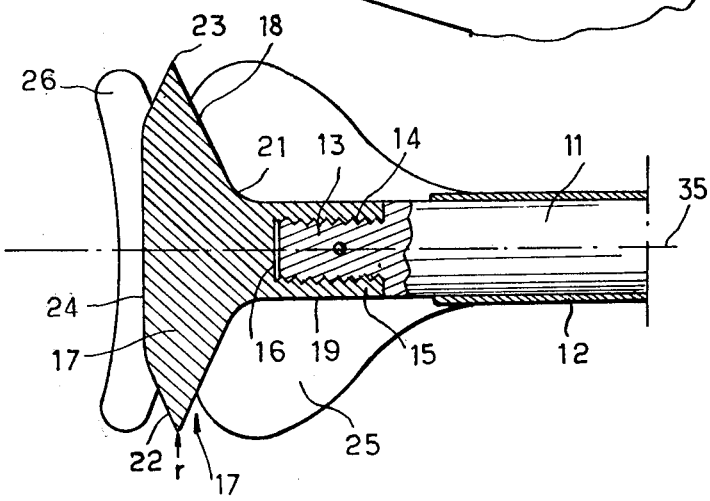
FIG. 3 is an axial cross-sectional detail view of the charge-emitting portion of a static discharger embodying our invention.

The stem 11 is sheathed in a protective coating 12 (FIG. 3) leaving free an end 13 of smaller diameter provided with a threading 14 to facilitate its connection with a tubular tail 15, having internal threads 16, of a transmitting head 17 made of a homogeneous resistive material of substantially the same resistivity as stem 11. The head 17, in the embodiment of FIG. 3, is a monobloc piece bounded by a frustoconical rear surface 18, centered on the axis 35 of stem 11, faired into the outer surface 19 of the tail portion 15 via a rounded portion 21. The frustoconical rear surface 18 is joined to a second frustoconical front surface 22, coaxial therewith but of opposed conicity, along a sharp peripheral edge 23 whose radius of curvature r is of the order of 0.05 mm. The frustoconical surface 22 surrounds a planar front surface 24. Between the frustoconical surface 18 and the stem 11 is a cap 25 of insulating material which has an aerodynamic function. A second cap 26 prevents discharges in areas others than edge 23 and protects the latter against impacts. Cap 26 covers the front face 24 and a portion of the beveled annular front surface 22.

Figure 4:
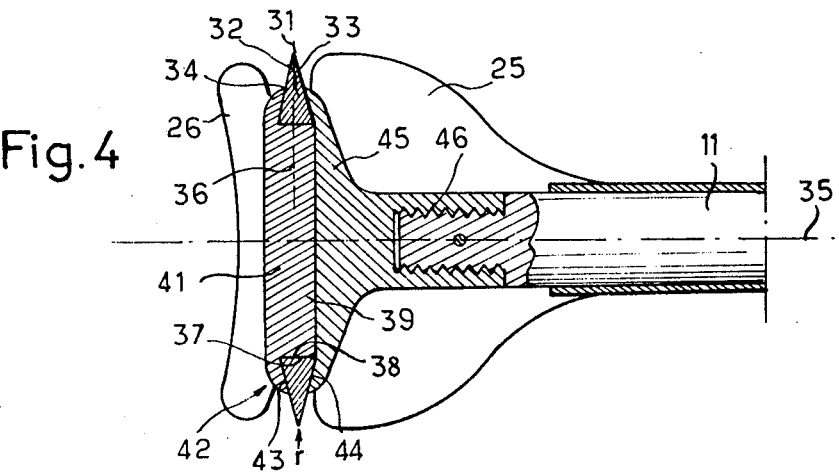
FIG. 4 is a view similar to that of FIG. 3, illustrating a modification.

In the modified structure shown in FIG. 4, the charge-emitting edge 31 with radius of curvature r is part of an annular insert 32, advantageously made of ferrite, bounded by two frustoconical surfaces 33 and 34, similar to surfaces 18 and 22 of the preceding embodiment, centered on the axis 35 common to stem 11 and to the head 42, the two frustoconical surfaces 33 and 34 being symmetrical to each other relative to a median plane 36 perpendicular to axis 35.

Insert 32 bears via a cylindrical inner surface 37 upon an outer cylindrical surface 38 of a reduced step 39 of a disc 41 forming the front portion of head 42, the disc having also a frustoconical shoulder 43 complementary to the insert surface 34; the other frustoconical surface 33 of insert 32 is engaged by a frustoconical shoulder 44 of a member 45 of head 42 terminating in a tubular tail 46 threaded onto stem 11.

In this embodiment, insert 32 is the only part required to have a hardness providing a good resistance to erosion, thereby making the manufacture of this unit more economical.

The assembly is held together by an electrically conductive glue.

The head 42 could also be formed by molding, the annular insert 32 being partially coated with a hardening resin filled with conductive particles such as graphite.

Figure 5:
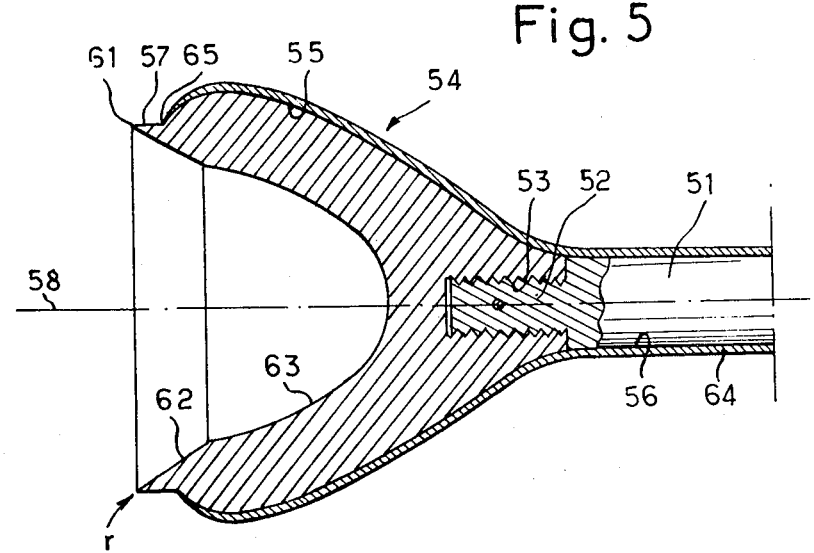
FIG. 5 is a view similar to those of FIGS. 3 and 4, showing another embodiment.

In FIG. 5 we have shown a stem 51 whose end remote from the aircraft body forms an extremity 52 of smaller diameter with male threads 53, its other end being connected to the aircraft via a fixation device as illustrated at 9 in FIG. 1. This device has a generally cup-shaped head 54 of ogival axial cross-section whose convex outer surface 55 is faired into the cylindrical peripheral surface 56 of stem 51 via a concave transition surface. The front end of the outer surface 55 adjoins a cylindrical surface 57 whose axis 58 coincides with that of the stem and constitutes the axis of revolution of the whole unit. A circular charge-emitting edge 61 is formed by the intersection of the cylindrical surface 57 with a frustoconical surface 62 constituting the rim of the mouth of head 54 open toward its front face; the remaining part of the inner surface of head 54 is of approximately ellipsoidal axial cross-section as is shown at 63.

A protective coating 64 covers stem 51 and the outer surface 55 up to the junction 65 of the latter with the cylindrical surface 57.

Figure 6:
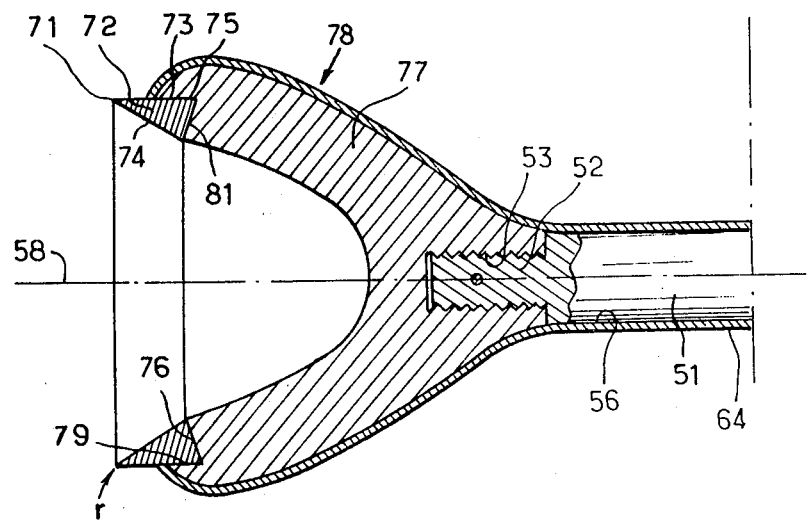
FIG. 6 is a view similar to that of FIG. 5, again illustrating a modification.

In the modification shown in FIG. 6, the charge-emitting edge 71 is formed on an annular insert 72 with cylindrical outer surface 73 and frustoconical inner surface 74. Surface 73 mates with a surface 75 of an annular recess 76 formed on a member 77 of a composite head 78, another surface 79 of that member mating with a base 81 of ring insert 72 which is fixedly connected to member 77 by an electrically conductive glue. Member 77, like the corresponding part of head 54 in FIG. 5, forms a bulge of larger diameter than the emissive edge having the radius of curvature r.

The circular configuration of the charge-emitting area provides a multiplicity of discharge points.

The static discharger according to the invention starts operating with a relatively low electric field.

It offers a good discharge efficiency. The reduction of radio-electric interference afforded thereby is of the order of 70 to 80 decibels.

Its electric or mechanical characteristics degrade only very slowly.

The shape of its head creates in flight a diminished-pressure area which is favorable for the reduction of the operating threshold.

Its protective coating may be made of a plastic material that is highly insulating and very resistant to abrasion.

The head may comprise one or more metallic parts providing a preferential path for lightning strokes without impairing its functional qualities as a static discharger.

Thanks to its circular configuration, the peripheral charge-emitting edge provides an orthogonal decoupling, the transmission taking place in a plane perpendicular to the axis of the stem connecting the head with the aircraft. As clearly shown in the drawing, this edge—whether projecting radially from the head, as in FIGS. 3 and 4, or axially, as in FIGS. 5 and 6—has a diameter substantially exceeding that of the associated stem 11 or 51.

We claim:

1. An electrostatic discharger for an aircraft, comprising:
    a stem of high electric resistivity having one end provided with fastening means for securing same to an aircraft body; and
    an enlarged head on the other end of said stem centered on the axis thereof, said head having an annular zone of homogeneous resistive material forming a continuous circular charge-emitting edge in a plane transverse to said axis, said edge having a diameter substantially exceeding that of said stem and being bounded by two substantially flat annular surfaces converging at an acute angle.

2. A discharger as defined in claim 1 wherein said annular surfaces are symmetrically frustoconical with respect to said transverse plane.

3. A discharger as defined in claim 1 wherein one of said annular surfaces is cylindrical and centered on said axis at a front face of said head remote from said stem, the other of said annular surfaces being frustoconical.

4. A discharger as defined in claim 3 wherein said head is generally cup-shaped with a mouth at said front face, said mouth having a rim constituted by said other of said annular surfaces.

5. A discharger as defined in claim 3 or 4 wherein said head forms a bulge of larger diameter than said edge between the latter and said stem.

6. A discharger as defined in claim 5 wherein said bulge has a surface faired into the periphery of said stem.

7. A discharger as defined in claim 1, 2, 3 or 4 wherein said head is detachably connected with said stem.

8. A discharger as defined in claim 1, 2, 3 or 4 wherein said edge has a radius of curvature of the order of 0.05 mm.

* * * * *